United States Patent [19]
Beck

[11] Patent Number: 4,966,054
[45] Date of Patent: * Oct. 30, 1990

[54] METHOD AND APPARATUS FOR THE MANUFACTURE OF A PUNCH HAVING A SHARP CUTTING EDGE

[75] Inventor: Rolf Beck, Leinfelden-Echterdingen, Fed. Rep. of Germany

[73] Assignee: Kocher & Beck OHG Gravieranstalt und Rotationsstanzenbau, Leinfelden-Echterdingen, Fed. Rep. of Germany

[*] Notice: The portion of the term of this patent subsequent to Jul. 18, 2007 has been disclaimed.

[21] Appl. No.: 127,249

[22] Filed: Dec. 1, 1987

[51] Int. Cl.⁵ ............................................. B21K 5/20
[52] U.S. Cl. ........................................ 76/4; 76/89.2; 76/107.8; 72/325; 72/412
[58] Field of Search ............... 72/4, 107 R, 107 C, 72/89.2; 72/412, 325, 71, 76; 10/153, 21, 9, 24

[56] References Cited
U.S. PATENT DOCUMENTS

| | | | |
|---|---|---|---|
| 1,113,900 | 10/1914 | Jackson | 72/76 |
| 2,467,302 | 4/1949 | Forster et al. | 76/89.2 |
| 3,905,283 | 9/1975 | Baker | 76/107 R |
| 4,528,836 | 7/1985 | Durand-Texte | 72/412 |
| 4,579,022 | 4/1989 | Kasai | 76/107 R |

Primary Examiner—Roscoe V. Parker

[57] ABSTRACT

This disclosure relates to a method and an apparatus for producing a punch (3) having sharp cutting edges (41) for label cutting apparatus or the like. In order that the cutting edges (41) may have a constant height and that they may be made semiautomatically, a punch body (3) is provided with a raised edge (4) in a first process step, by etching for example, and this edge is then made into a sharp cutting edge (21) in a second process step by hammering. An apparatus suitable for this purpose contains a table (2) for the punch body (3), over which tool (32, 70) in the form of a hammering and/or cutting tool and having an roof-shaped notch (34) is disposed, which can be reciprocated automatically in the direction of the table (2) between two dead centers in order to give the raised edge (4) an external contor corresponding to the roof-shaped contour of the notch (34).

16 Claims, 5 Drawing Sheets

METHOD AND APPARATUS FOR THE MANUFACTURE OF A PUNCH HAVING A SHARP CUTTING EDGE

BACKGROUND INVENTION

The invention relates to a method and an apparatus for producing a punching tool, especially for label cutting apparatus, which has a sharp cutting edge, wherein a punch body is provided in a first process step with a raised edge and this edge is sharpened in a second process step to form sharp cutting edge.

For cutting through soft materials, such as papers, plastic films, textiles, flexible circuit boards, labels or the like, punching devices are mostly used which have punches with sharp cutting edges. The punches can consist, for example, of platens, cylinders, or flexible plates held on cylinders, the cutting edges of which project in the form of sharpened, raised edges.

The cutting edges should have a uniform height over the entire punch. In the manufacture and further processing of pressure-sensitive or gummed labels, for example, the starting material consists of a label paper provided with an adhesive coating. The purpose of the punch is to act on the starting material such that the label paper will be completely cut through according to the desired contour of the labels, but the backing strip will remain virtually uncut. If this requirement is not satisfied trouble will be encountered in the automatic production of the labels whenever the "lattice" surrounding the labels is removed from the backing strip or when, during the further handling of the labels in an automated production apparatus, such as a packaging machine or an envelope addressing and labeling machine, the labels themselves are pulled from the backing strip to be applied to an object. If the label paper has not been cut through cleanly all around in the punching process, the "lattice" pulls the labels with it, resulting in a nuisance and in some cases a long shut-down of the entire production system Similar disadvantages result when not only the label paper but also the backing is wholly or partially cut through, since in this case the labels cannot be released correctly without pulling pieces of the backing with them. Since the label paper often has a thickness of only 0.1 mm and the backing a thickness of only 0.05 mm, the height of the cutting edges of the punch must satisfy tolerances of several hundredths of a millimeter down to less than one hundredth of a millimeter. Such high tolerances are desired also when paper webs without a protective backing web are involved and, for example, a window is to be punched into a mailing envelope so that the backing used in the punching process and consisting for example of rubber or steel will neither be destroyed nor cause the rapid dulling of the cutting edges.

It has been common practice heretofore to form the raised edges in a first process step, for example by removing the areas surrounding them by erosion or etching and then, in a second process step, to provide the raised edges with sufficiently sharp cutting edges by manual, mechanical treatment, because with the etching methods known heretofore neither the desired thin cutting edges of about 0.01 mm and less nor the necessarily close height tolerances can be guaranteed. The method used in the second step of the process consists mostly in scraping the raised edges with a sharp edge of an engraving burin or the like, manually, from at least one side under a magnifying glass, which not only is a time-consuming, tiring activity and calls for well-trained workers, but also easily leads to flaws which can result in the rejection of an entire punching die. Working from the sides furthermore requires that the original punch body from which the punch is made be itself subject to close tolerances, so that only high-quality materials may be used for this purpose. Overall, this results in slow deliveries of the punch bodies and/or in slow production of the punches, which is intolerable to the people ordering and using the punches, who must retool quickly and at reasonable prices to produce the label formats or the like which their customers desire.

The invention is addressed to the task of devising a method and an apparatus by means of which the manual finishing of a raised edge produced by etching or otherwise on a punch can be performed semiautomatically. The invention furthermore is to make it possible for the height tolerances in the production of the raised edges in the first step of the process to be less critical than heretofore, and to some extent to equalize variations in thickness of the punch bodies.

SUMMARY OF THE INVENTION

This task is accomplished by using as a method sharpening of the raised edge by hammering; and by the apparatus comprising a table for the punch body, a tool with a roof-shaped notch disposed over the table, drive means connected with the tool for its automatic movement back and forth in the direction of the table, and an adjusting mechanism for setting the height position of the tool over the table.

The invention is based on the surprising discovery that a raised edge which cannot be used for punching thin paper webs or plastic films can be provided with a very sharp cutting edge having a defined and constant height within close tolerances by a hammering process. Since the hammering process can be performed semiautomatically and at a high frequency, the time required for the production of the punches is considerably shorter than formerly. It is furthermore advantageous that the hardening of the material that takes place i the transformation of the raised edge edge to a cutting edge makes it possible to use metals of lesser quality rather than the high-quality metals which have been used heretofore to achieve dies of longer useful life. Furthermore, the height tolerances of the cutting edge depend mostly on the tolerances in the hammering process, which can be kept very small, so that lesser demands can be placed on the punches, particularly in regard to their thickness tolerances, thereby shortening the time required for their production. Lastly, the advantage is achieved that the finishing of the raised edges is no longer a tiring, monotonous activity that can be performed only with great concentration, because the manual activity is reduced substantially to the advancement of the punch body during the hammering process and the inspection of the cutting edges produced.

DESCRIPTION OF THE DRAWINGS

The invention will be further explained below by means of an embodiment in conjunction with the appended drawing, wherein.

DESCRIPTION OF PREFERRED EMBODIMENT

Figure 1:
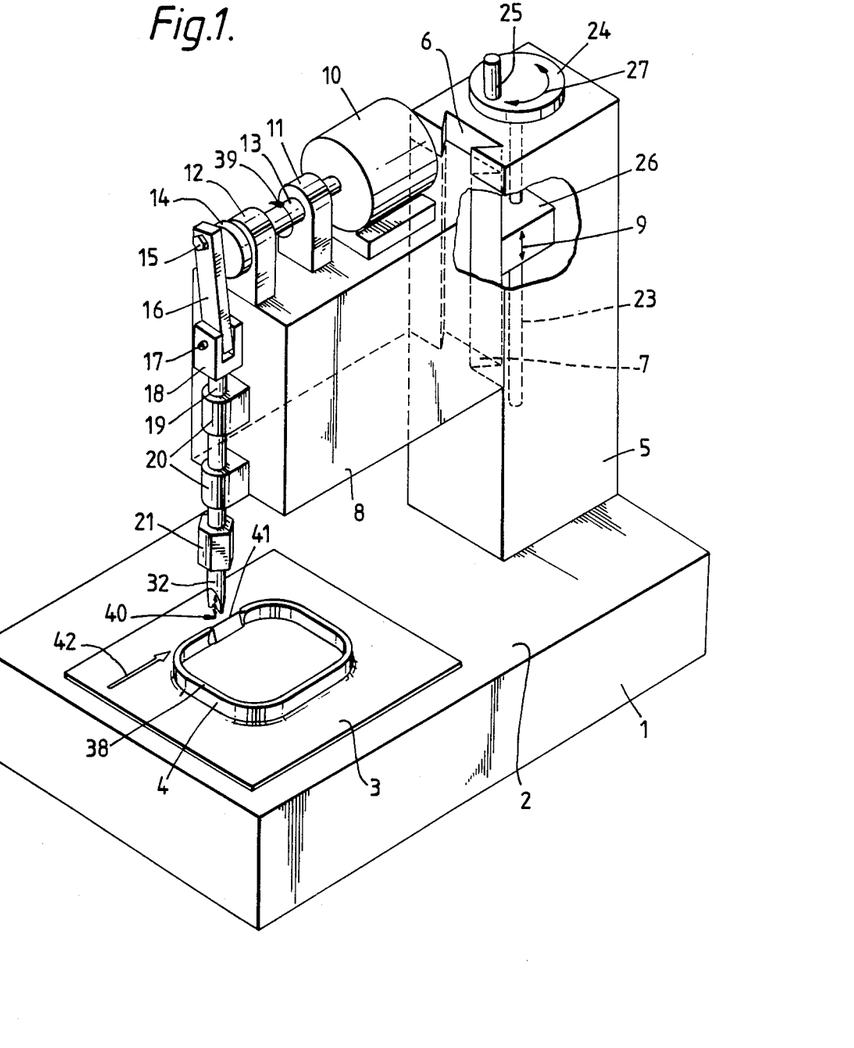
FIG. 1 is a perspective representation, partially cut away, of an apparatus according to the invention engaged in sharpening a straight raised edge.

The apparatus according to FIG. 1 contains a work table 1 with a table top in the form of a horizontal work platen 2 for holding a punch body 3 with a flat bottom, which has been provided in a first process step with a raised edge 4, which after the punch body 3 has been laid on the work platen 2 projects substantially vertically upward. At one end of the work table 1 there is a vertical column 5 which is provided on a side facing the work platen 2 with a dovetail guide 6. A matching dovetail guide body 7 on an arm 8 extending laterally over the work platen 2 is disposed with a sliding fit in this guide 6 and can be moved vertically upward and downward in the direction of a double-headed arrow 9.

On the upper side of the arm 8 there is mounted a motor 10, preferably an electric motor, and two pillow blocks 11 and 12 in which a drive shaft 13 connected to the driving shaft of the motor 10 is journaled. On the end of the driven shaft 13 a circular disk 14 is coaxially fastened, which has an excentrically disposed pin 15 which is mounted rotatably in one end of a connecting rod 16. The other end of the connecting rod 16 is mounted by means of a pivot pin 17 so as to pivot between the two side walls of a U-shaped coupling 18 whose web is fastened to one end of a rod 19. The latter is mounted with a sliding fit in two additional pillow blocks 20 fastened to the front face of the arm 8 such that it can be moved upward and downward perpendicularly to the driven shaft 13 and to the work platen 2. The upward and downward movement of the rod 19 is performed by the drive means formed by the motor 10, the driven shaft 13, the disk 14, the pin 15 and the connecting rod 16, the stroke length of the up-and-down movement being constant and depending on the radial distance of pin 15 from the center of the disk 14. On the other, bottom end of the rod 19 there is mounted a chuck 21, which can be any known fast-acting chuck of conventional machine tools or can even be only a vertical bore in which the shank of a tool can be fastened by means of a screw or the like.

The entire part of the apparatus consisting of the drive means and chuck 21 and mounted on the arm 8 can be raised and lowered vertically over the work platen 2, in the direction of the double arrow 9, by means of an adjusting mechanism. The adjusting mechanism contains a threaded spindle 23 which is mounted rotatably and perpendicularly to the work platen 2 in the column 5, and has a wheel 24 with a handle 25 on one end projecting from the column 5. The threaded spindle 23 passes through a bore that is coaxial with it and provided with a corresponding internal thread, formed in a prolongation 26 of the guide body 7. The prolongation 26 is disposed in a cavity in the column 5. By rotating the wheel 24 and with it the threaded spindle 23 in the direction of a double arrow 27, the prolongation 26, and with it the arm 8, is thus raised and lowered, the guide body being carried slidingly in the guide 6.

Figure 3:
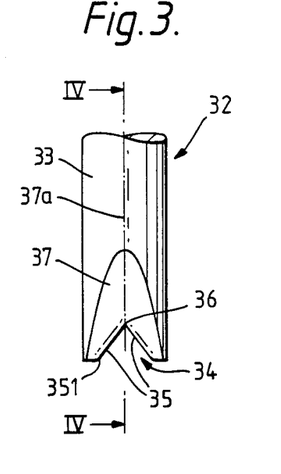
FIG. 3 is a front view of a hammering tool according to the invention.
Figure 4:
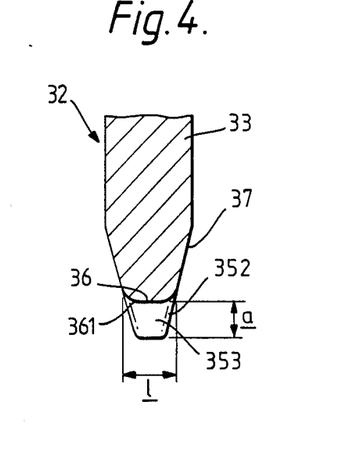
FIG. 4 is a section taken along line IV-IV of FIG. 3, FIGS. 5a to 5d show a diagrammatic representation, partially in section, of the conversion of a raised edge to a cutting edge by the hammering method of the invention.

The chuck serves for clamping a hammering tool 32 according to the invention, which is represented diagrammatically and greatly enlarged in FIGS. 3 and 4. The hammering tool 32 contains a shank 33 one end of which is clamped in the chuck 21 and the other end has a roof-shaped notch 34 of V-shaped cross section. The open side of the notch 34 faces the work platen 2 after the hammering tool 32 is chucked. The notch 34 is formed by two lateral surfaces 35, which are planar for example, and which converge in a roof-like manner and join one another along a ridge line 36 perpendicular to the shank axis. At their bottom end the lateral surfaces 35 can be slightly rounded (351 in FIG. 3). The ridge line 36 may, depending on how the tool is made, have a slight radius of a few hundredths of a millimeter. The ridge line 36 is preferably rectilinear only in its middle portion, but at its ends it may be rounded slightly upwardly (361 in FIG. 4) so as to avoid sharp impressions of its extremities in the raised edges. For the same reason the lateral surfaces 35 are preferably rounded outwardly (352 in FIG. 4) at their outer boundaries between their bottom, rounded areas and the transitions to the shank 33, so that they are still flat only in their middle (353 in FIG. 4). The special purpose of the hammering tool calls for such fine machining that the radii of curvature of the roundings amount to from a few tenths of a millimeter down to a few hundredths of a millimeter. By forming indentations 37 in the sections of the shank adjoining the notch 34 the notch 34 can be given any desired length between a very short length and a length equal to the diameter of the shank 33. Otherwise at least the lateral surfaces 35 consist of a sufficiently hard material, e.g., a hardened steel, a sintered material or a wear-resistant hard metal. The angle formed by the lateral surfaces 35 in the area of the ridge line 36 amounts, for example, to say 60° to 90°, but depends substantially on the circumstances of the individual case and must therefore be determined experimentally. The depth of the notch 34 (dimension a in FIG. 4) can amount to about 0.25 millimeter, while the length of the notch 34 (dimension 1 in FIG. 4) amounts to about 0.5 millimeter or less.

A hammering tool 32 made in one piece is represented in FIGS. 3 and 4. In this case the ridge line 36, due to the manufacturing technique, will have a small radius of a few hundredths of a millimeter. Alternatively, a multi-part, especially a two-part hammering tool 32 can be provided, which is divided, for example, along its central plane 37a (FIG. 3), so that the ridge line 36 is formed by two adjacent parts and therefore can be sharp-edged. Other divisions are conceivable, for example in planes which enclose one of the two lateral surfaces 35. The individual parts of the hammering tool are cemented, soldered, welded, clamped or otherwise fastened together.

The apparatus according to the invention operates as follows:

First a punch body 3 is laid with its flat surface on the likewise flat work platen 2, the punch body 3 being already provided with a raised edge 4 created by an etching, milling or erosion process or the like, which rises up from the punch body 3. The upper surface 38 of the raised edge is relatively broad and unsuitable as a cutting edge. By means of the adjusting mechanism the arm 8 is moved downward until the raised edge 4 is situated anywhere within the notch 34 and between its lateral surfaces 35. The hammering tool is then preferably at its top dead center, so that it can simultaneously be so adjusted that the following hammering process will result in the desired raised-edge height. Then the motor 10 is turned on so that the driven shaft 13 is made to rotate in the direction of an arrow 39, and thus the rod 19, the chuck 21 and the hammering tool 32 are moved up and down in the direction of a double arrow 40. The rotatory speed of the driven shaft 13 can be, for example, 20,000 rpm. The raised edge is thus subjected at its surface 38 to a hammering with the result that the surface 38 is gradually converted to a sharp cutting edge 41 (FIG. (1) which assumes in the area of the cutting edge essentially the shape which the hammering tool 32 has in the area of the ridge line 36.

The punch body 3 is then manually advanced in the direction of an arrow 42 (FIG. 1), and the direction of movement should be rather precisely parallel to the axis of the raised edge 4. Since furthermore the ridge line 36 of the hammering tool 32 should be aligned always precisely with the center of the raised edge 4 or of its surface 38, the stroke length of the hammering tool 32 is preferably made smaller than the height a (FIG. 4) of the notch 34. This assures that the raised edge 4 will always be covered laterally by the side surfaces 36 even during the hammering process and will be guided thereby so that a certain self-centering will take place and the punch body 3 actually will need only to be advanced, following the axis of its raised edge.

Figure 2:
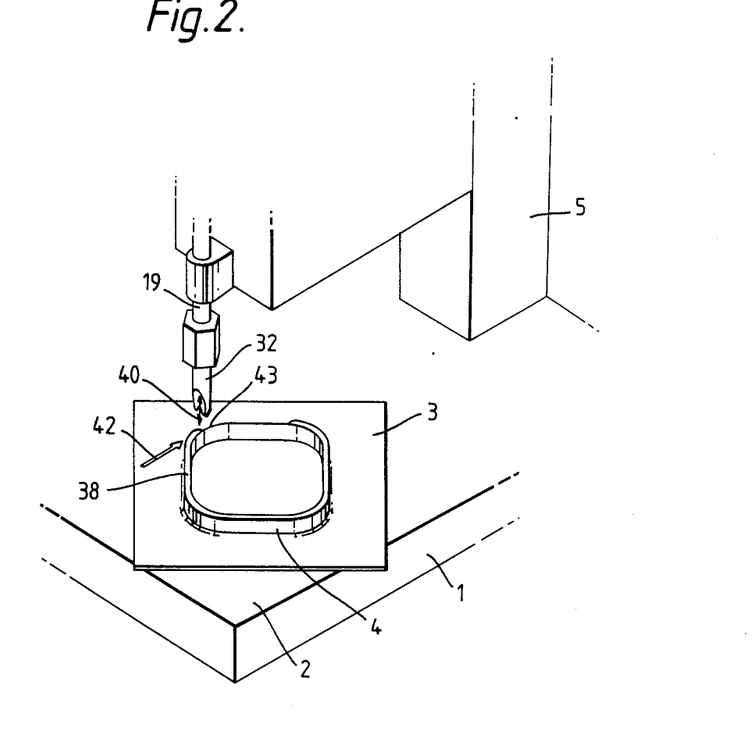
FIG. 2 is a detail of the apparatus according to FIG. 1 engaged in sharpening a curvilinear raised edge.

In the area of a curved section of the raised edge 4 (FIG. (2) the punch body 3 is to be rotated accordingly, so that the arrow 42 or direction of advance will always be in the direction of a tangent to the raised edge and a correspondingly curved cutting edge 43 will be formed. The above-described self-centering occurs also in the case of curved sections, and the shorter the notch 34 is, i.e., the smaller the dimension 1 (FIG. 4) is, the shorter can be the radii of the curved sections of the raised edges 4.

Figure 5A:
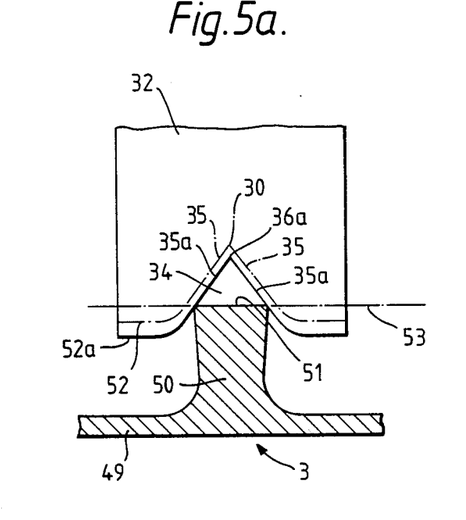
Figure 5B:
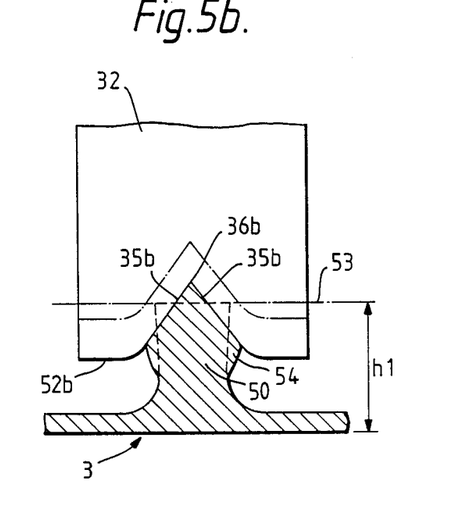
Figure 5C:
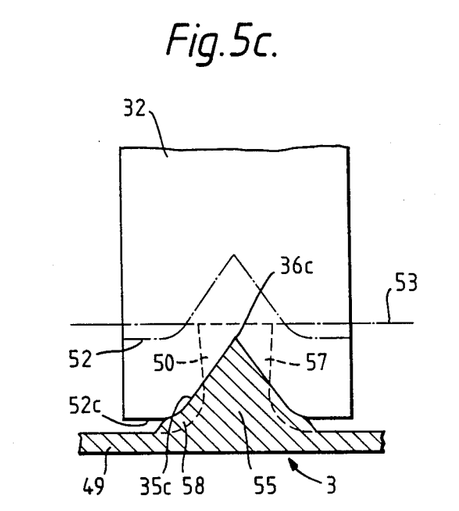
Figure 5D:
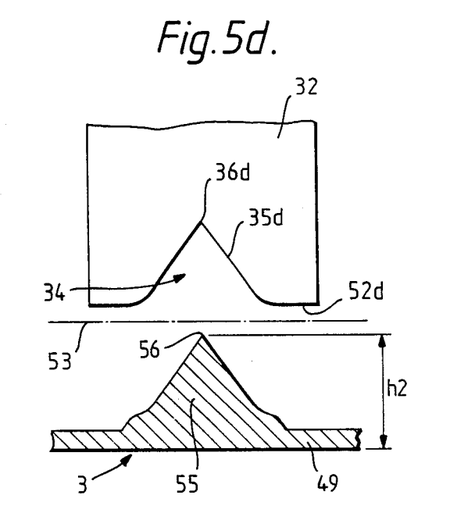

Alternatively it would be possible to mount the arm 8 for displacement parallel to the work platen 2 and/or to mount the hammering tool 32 and its longitudinal axis rotatably in order to perform relative movements between the punch body 3 and the hammering tool 32, as required for the working of the raised edge 4. Details of the hammering process are represented diagrammatically and greatly enlarged in FIGS. 5a to 5d. FIG. 5a shows a section of the punch body 3 in the form of a flexible piece of sheet steel originally 0.44 to 0.46 mm thick, for example, on whose upper side a raised edge 50 is formed which prior to the etching process was covered with a photoresist, and is left upstanding by the etching process, and therefore has a comparatively broad upper surface 51. The sections of the punch body 3 adjacent to the raised edge 50 have been removed by the etching, so that the punch body 3 has only the thin sheet metal strip 49 that is 0.12 mm thick, for example, remaining between the raised edges 50. Above the raised edge 50 is the hammering tool 32 in whose bottom edge the notch 34 is formed, whose height a (FIG. 4) amounts to about 0.2 to 0.25 mm, so that the hammering tool 32 cannot be laid onto the upper surface of the sheet metal strip 49. In FIGS. 5a, 5b and 5c the bottom edge of the hammering tool 32 is represented in each case by a broken line 52 which indicates the position which the bottom edge would assume at the top dead center of the hammering tool 32. On the other hand, the solid lines 52a to 52d in FIGS. 5a to 5d indicate the momentary actual position of the bottom edge of the hammering tool 32. Accordingly, the parts 35 and 36 are additionally provided with the letters a to d in the various positions. A line 53 defines the height h1 of the raised edge after the etching, with respect to the flat bottom edge of the punch body 3. This height h1 must not vary by more than several hundredths of a millimeter over the entire length of the raised edge 50; this amounts, for example, to the usual tolerances in the production of sheet metal.

It can be seen from FIG. 5a that the hammering tool 32 has been lowered from its top dead center to the point at which the lateral surfaces 35a of its notch 34 just contact the arrises of the raised edge, so that still no deformation has occurred. It can furthermore be seen that the top dead center (line 52) has been selected at such a height that when it is reached the raised edge 50 is free and consequently the punch body 3 can be advanced, but the two lateral surfaces still overhang the raised edge 50 on both sides so that, even with the hammering tool 32 in its top dead center position the punch body cannot be removed all the way out of the notch 34 to either side, i.e., to the right or left in FIG. 5a. Upon a manual advancement of the punch body 3 in the line of the raised edge 50 a self-centering will therefore always be produced, and the centering error will amount to no more than the open space between the arrises of the raised edge 50 and the lateral walls 35.

In the position according to FIG. 5b, the hammering tool 32 has been lowered further down. This has caused the originally relatively broad surface 51 of the raised edge 50 to be already wholly or partially shaped into a sharp cutting edge in the cold state, and also the upper sections of the lateral walls of the raised edge 50 adjacent to the cutting edge already lie tightly against the contour of the hammering tool 32. Under the bottom edge 52b of the hammering tool 32 squeezed-out portions of material 54 have formed on the lateral walls of the raised edge 50. FIG. 5c shows the hammering tool 32 arriving at the bottom dead center (line 52c). The bottom edge of the hammering tool 32 is close to the upper surfaces of the sheet metal strip 49, and the material contained in the original raised edge 50 has flowed almost entirely into the notch 34. The original raised edge 50 shown in broken lines in FIG. 5c has been converted to a cutting edge 55 having a virtually knife-sharp edge 56 (FIG. 5d) whose height h2, measured from the bottom edge of the punch body 3, is slightly smaller than the height h1 of the original raised edge and amounts, for example, to about 0.43 mm. The layers of material 57 (FIG. 5c) removed from the upper side of the raised edge 50 have partially or entirely flowed into the foot portions of the original raised edge 50 which are slightly undercut by the etching process, and have there resulted in spreading at 58 so that the cutting edge has a substantially triangular cross section corresponding to the roof-shaped notch 34. After the sharpening of the entire raised edge 50 is completed the hammering tool 32 is raised by means of the adjusting mechanism above the top dead center (FIG. 5d), so that the punch body can be withdrawn laterally and then, after a process for hardening the cutting edge 55 if desired, it can be used as a punch.

One special advantage of the method according to the invention consists in the fact that the height h2 of the finished cutting edge 55 along its entire length depends only on the distance between the top dead center (FIG. 5c) from the working platen 2 on which the punch body 3 lies during the process, and therefore it is a constant of the apparatus. Care need only to be taken that the initial height h1 of the raised edge 50, which is formed by the etching or the like, is greater than the height h2 which corresponds to the required height h2 of the cutting edge 55 of the finished punch 3, i.e., neither in the production of the punch 3 nor in the production of the raised edges 50 is it necessary to observe particularly close tolerances. Since the height h2 for the later punching process is to be very precisely constant over the entire length of the cutting edge 55, the bottom dead center is preferably established by means of a driving device in which the driving force is transmitted positively to the clamping device 21 and the hammering tool 32, respectively. The retraction back to the top dead center, however, can also be performed by a nonpositive coupling of force. The arrangement can be such that the cutting edge 55 is formed in a single hammering process, or that two or more operations are performed, for example by making the bottom dead center of the hammering tool 32 step-wise deeper in successive stages. Alternatively, the bottom dead center position can also be established by means of a nonpositive device, e.g., a piezoelectric or electromagnetic device, in which case as a rule several hammering actions are also required for each section of the raised edge until its proper level is reached.

Figure 6:
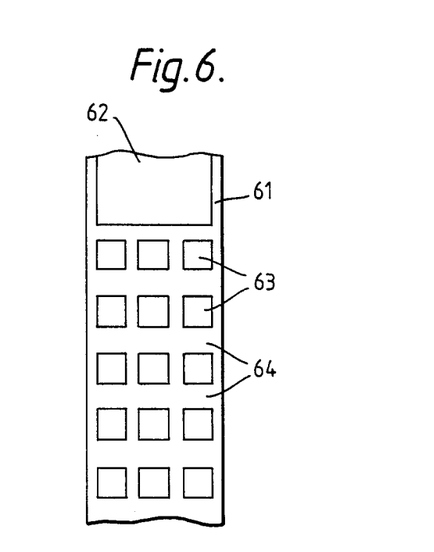
FIG. 6 is a diagrammatic plan view of a sample of punched pressure-sensitive labels.
Figure 7:
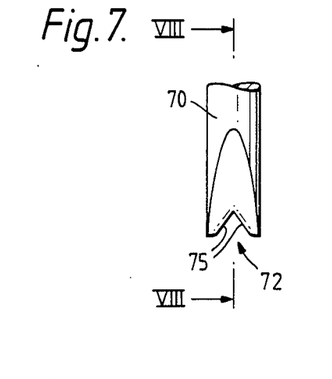
FIGS. 7 and 8 are views corresponding to FIGS. 3 and 4 of a combined hammering and cutting tool.
Figure 8:
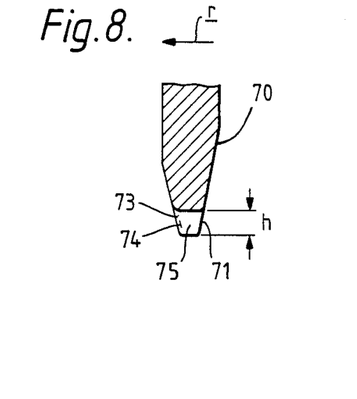

The punch body 3 represented in FIGS. 1 and 2 serves after its raised edges 4 have been sharpened, or after the production of the cutting edges 41 and 43, for punching out, say, rectangular labels or the like, and it has for this purpose a single, continuous cutting edge. In the production of labels, however, it is common to punch out a plurality of adjacent labels simultaneously. FIG. 6 shows for example a backing strip 61 for pressure-sensitive label paper 62 from which twelve labels 63, for example, are punched out in a single punching operation. The spaces 64 represented between these labels form a continuous lattice which represents waste and which is removed from the backing strip 61 before the labels 63 are used. Each individual label 63 is cut out by means of a continuous cutting edge 41, 43, in accordance with FIGS. 1 and 2.

The invention is not limited to the preferred embodiment described, which can be modified in many ways. Instead of the crank or cam drive represented for driving the hammering tool 32, other drives can be provided, and the changing of the height of the arm 8 can be performed by other than the means shown. Furthermore, the invention is not limited to the use of punch bodies with a flat bottom. Instead, cylindrical punch bodies can be used, or punch bodies clamped around cylindrical work platens. In this case raised edges parallel to the cylinder circumference can be carried past the hammering tool by rotating the cylinder or the cylindrical work platen, while in the treatment of raised edges parallel to the cylinder axis either the cylinder or cylindrical work platen or the hammering tool would have to be disposed for movement parallel to the cylinder axis. It would be conceivable in this case, for example, to mount the column 5 of the apparatus for displacement on the work table 1 and to provide the latter with a rotatable cylindrical work platen or a holder for rotatably mounting a cylindrical punch body. Furthermore, the adjusting mechanism might be associated with the work platen 2 instead of the arm 8.

Also, the invention is not limited to the stated dimensions and other parameters, which are given only by way of example and relate to a practical embodiment. The dimensions and parameters to be selected in the individual case depend greatly on the nature or the size of the articles to be punched.

It can furthermore occur that the punch bodies have raised edges with portions that cross one another. In the sharpening of such raised edges the hammering tool is to be raised up from the punch body in the area of the crossings and the finishing of the crossings is to be performed manually as heretofore, e.g., with scrapers, burins or the like.

The invention can furthermore be applied both to punch bodies of hardened material, e.g., steel, and to punch bodies of comparatively soft materials which are hardened after hammering.

Lastly, the work platen 2 does not need to be disposed horizontally nor does the hammering tool 32 have to be movable vertically up and down. Other arrangements of the work platen 2 and reciprocating movements of the hammering tool 32 are possible, especially those in which the reciprocating movement of the hammering tool 32 is performed against the work platen 2, but not precisely perpendicularly to its surface.

A modification of the method described can furthermore consist in combining the hammering action according to FIGS. 7 to 10 with a cutting or scraping action. For this purpose a tool 70 is provided whose front surface facing against the direction of advancement of the punch body (arrow r) merges along a sharp cutting or scraping edge 71 (FIG. 8) with a V-shaped notch 72. As it appears from a comparison of FIGS. 3, 4, on the one hand and FIGS. 7, 8 on the other, the tools 33 and 70 are otherwise substantially identical in construction. This appears in the fact that tool 70 also has in its rear part a rounded transition edge 73 which is indicated in broken lines in FIG. 7 and begins at about the line 74, but is lacking on the front side. The lateral surfaces 75 serving for the hammering, which define the V-shaped notch 72, are again largely flat.

Figures 9, 10:
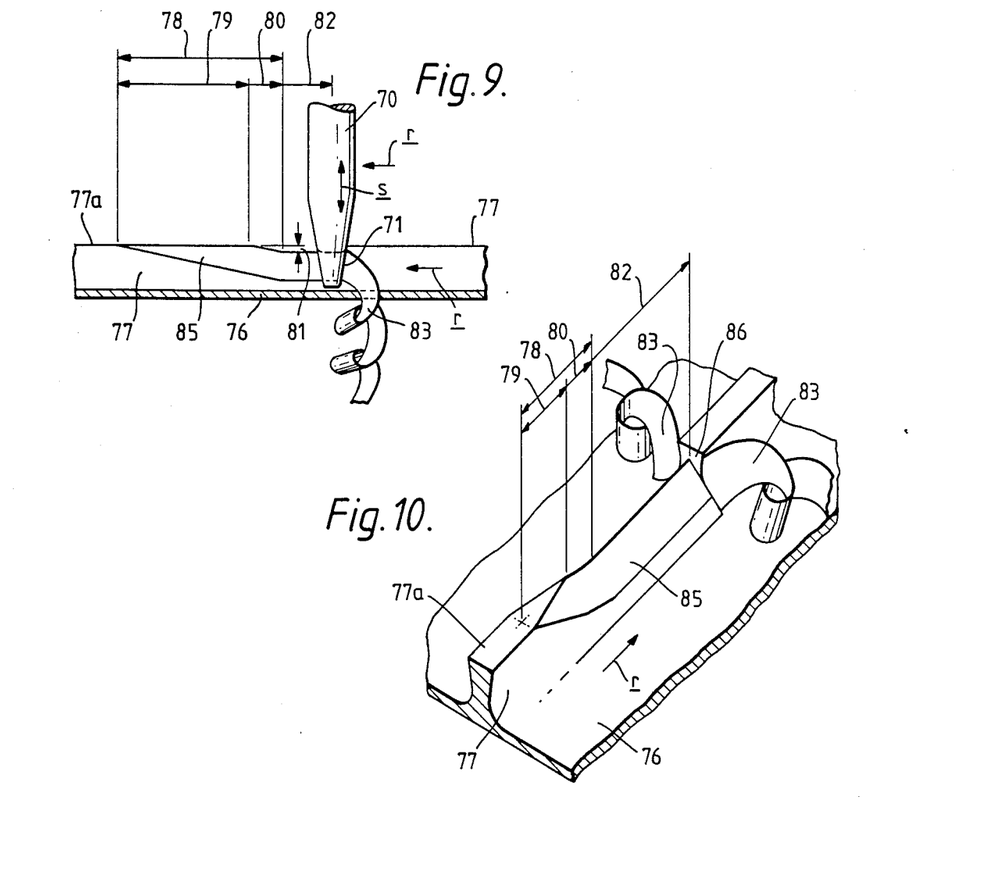
FIGS. 9 and 10 represent diagrammatically the use of the tool according to FIGS. 7 and 8 for producing a cutting die having a sharp cutting edge.

FIGS. 9 and 10 show the tool 70 sharpening a punch body 76 with a raised edge 77. By the appropriate controlling of the arm 8 (FIG. 1) the tool 70 is not placed at its finally intended height immediately at the beginning of the hammering process. Instead, during the advancement (arrow r) and its oscillation (arrow s) it is gradually lowered onto the raised edge 77 in a lead-in section 78 (FIG. 9), so that its height 77a remains the same along a first portion 79 of the entering movement. Only in the final section 80 is the raised edge 71 lowered to its intended level by additionally lowering the tool 70, the intended level being lower by the amount indicated by 81 in FIG. 9 than the original height 77a, and remains the same as the sharpening continues (section 82 in FIGS. 9 and 10).

While the tool 70 is being lowered the raised edge 77 is sharpened both by hammering and by cutting or scraping as the sharp cutting or scraping edge 71 on the front side of the tool 70 removes chips 83 on both sides of the raised edge 77 (FIGS. 9 and 10). This process continues over the entire length of the raised edge 77. The lateral surfaces 85 formed by combined hammering and cutting, or scraping which thus remain, are represented by cross-hatching in FIG. 10. The arrow r indicates the direction of movement of the punch body 76. The tool 70 is to be understood as being momentarily in a position just in front of the point of transition 86 between an already sharpened and a still unsharpened portion of the raised edge 77.

The combined sharpening of the raised edge 77 by hammering and cutting or scraping can lastly be replaced by a method which is characterized by cutting or scraping alone. For this purpose it is necessary only to shut off the oscillating movement of the tool 70 produced by the motor 10 and drive the punch body 76 in the direction of the arrow r. The specified height of the tool 70 can also be reached gradually within the distance 78. Aside from that it is possible by a combined hammering and cutting or scraping action to adjust the amplitude of the oscillatory movement (arrow s) to any appropriate value.

I claim:

1. An apparatus for producing a punching tool having a sharp cutting edge, especially for label cutting apparatus, from a punch body having a raised edge, comprising: a table for the punch body, a tool with a roof-shaped notch disposed above the table, drive means connected with the tool for automatically moving the tool back and forth in the direction of the table, and an adjusting mechanism for setting the height position of the tool above the table.

2. An apparatus according to claim 1, wherein said drive means have a motor, and a crank drive driven by the motor.

3. An apparatus according to claim 1, wherein the adjusting mechanism has a column with a lateral guide running in the direction of the table, and a laterally extending arm bearing the tool, the drive means being mounted for displacement in said guide.

4. An apparatus according to claim 3, wherein the adjusting mechanism has a threaded spindle which is rotatably mounted in the column and is provided with a hand wheel, said spindle passing through a threaded bore in a lateral extension of the arm, said extension being disposed for reciprocating movement in the column.

5. An apparatus according to claim 1, wherein, the tool is a hammering tool.

6. An apparatus according to claim 1, wherein the tool is a cutting or scraping tool.

7. An apparatus according to claim 1, wherein the tool is a hammering and a cutting or scraping tool.

8. A method of producing a punching tool, especially for a label cutting apparatus, comprising the steps of: in a first process step providing a punch body of the punching tool with a raised edge, and in a second process step thereafter sharpening the raised edge into a sharp cutting edge by at least one process selected from hammering, and cutting or scraping.

9. A method according to claim 8, wherein the at least one process is hammering.

10. A method according to claim 9, wherein the at least one process is cutting or scraping.

11. A method according to claim 9, wherein the process is hammering and cutting or scraping.

12. A method according to claim 9 or 11, wherein the hammering is performed by a V-shaped tool which is movable back and forth with a constant stroke, said tool having a rod-shaped notch under which the punch body is moved along following an axis of the raised edge.

13. A method according to claim 12, wherein the stroke of the tool is selected such that it constantly overlaps the raised edge in and between two dead centers of the stroke and thereby guides the punch body laterally.

14. A method according to claim 12, wherein the tool is driven with positive guidance at least during the movement toward the punch body.

15. A method according to claim 9 or 11, wherein the punch body is manually advanced during the hammering process and upon the occurrence of a curve in the raised edge is turned accordingly.

16. A method according to claim 8, wherein the raised edge is produced by etching the punch body.

* * * * *